United States Patent [19]
Tseng

[11] Patent Number: 5,595,271
[45] Date of Patent: Jan. 21, 1997

[54] ELECTRIC VEHICLE PICK-UP POSITION CONTROL

[76] Inventor: Ling-Yuan Tseng, 13772 Calle Tacuba, Saratoga, Calif. 95070

[21] Appl. No.: 511,991

[22] Filed: Aug. 7, 1995

[51] Int. Cl.⁶ .................................................. B60L 5/00
[52] U.S. Cl. .................................................. 191/4; 191/10
[58] Field of Search .............................. 191/3, 4, 6, 10, 191/14, 15, 22 C; 180/2.1; 104/288, 289, 291, 293, 304; 307/9.1, 10.1

[56] References Cited

U.S. PATENT DOCUMENTS

| 3,914,562 | 10/1975 | Bolger | 191/4 X |
| 4,092,554 | 5/1978 | Quinn . | |
| 4,199,037 | 4/1980 | White . | |
| 4,331,225 | 5/1982 | Bolger | 191/10 |
| 4,581,572 | 4/1986 | Yoshiyuki et al. . | |
| 4,800,328 | 1/1989 | Bolger et al. | 191/4 X |
| 4,836,344 | 6/1989 | Bolger | 191/15 X |
| 5,115,173 | 5/1992 | Kobayashi et al. | 104/293 X |
| 5,174,215 | 12/1992 | Barrows | 104/288 |
| 5,207,304 | 5/1993 | Lechner et al. | 191/10 |
| 5,215,156 | 6/1993 | Stulbach et al. | 180/65.3 |
| 5,244,054 | 9/1993 | Parry | 180/165 |
| 5,280,827 | 1/1994 | Taylor et al. | 180/165 |
| 5,287,004 | 2/1994 | Finley | 290/55 |
| 5,311,973 | 5/1994 | Tseng et al. | 191/10 |

FOREIGN PATENT DOCUMENTS

| 0289868 | 11/1988 | European Pat. Off. | 191/10 |
| 2830027 | 1/1979 | Germany | 191/59.1 |
| 2831396 | 2/1979 | Germany | 191/59.1 |
| 1271771 | 11/1986 | U.S.S.R. | 191/59.1 |

Primary Examiner—Karen B. Merritt
Assistant Examiner—Scott L. Lowe
Attorney, Agent, or Firm—Gifford, Krass, Groh, Sprinkle, Patmore, Anderson & Citkowski

[57] ABSTRACT

In an electrically powered vehicle having an inductive pick-up configured to couple electrical power from a series of aligned and spaced-apart charging pads associated with a road surface, methods and apparatus are disclosed for controlling the lateral positioning of the pick-up as well as the gap between the pick-up and the charging pads as the vehicle moves along a road surface. Control of the lateral positioning and gap may be provided either separately or in combination. In the preferred embodiment, the pick-up is pivotally connected to the vehicle through an extension arm, the pivotal connection including a first position wherein vertical positioning of the pick-up is power controlled toward and away from the road surface, and a second position wherein airflow past the pick-up maintains the positioning of the pick-up relative to the road surface. In terms of lateral positioning, the apparatus further includes a camera capable of sensing the charging pads as the vehicle moves, and apparatus in operative communication with the camera for moving the pick-up side-to-side as the vehicle moves in response to the position of the charging pads as sensed by the camera.

21 Claims, 2 Drawing Sheets

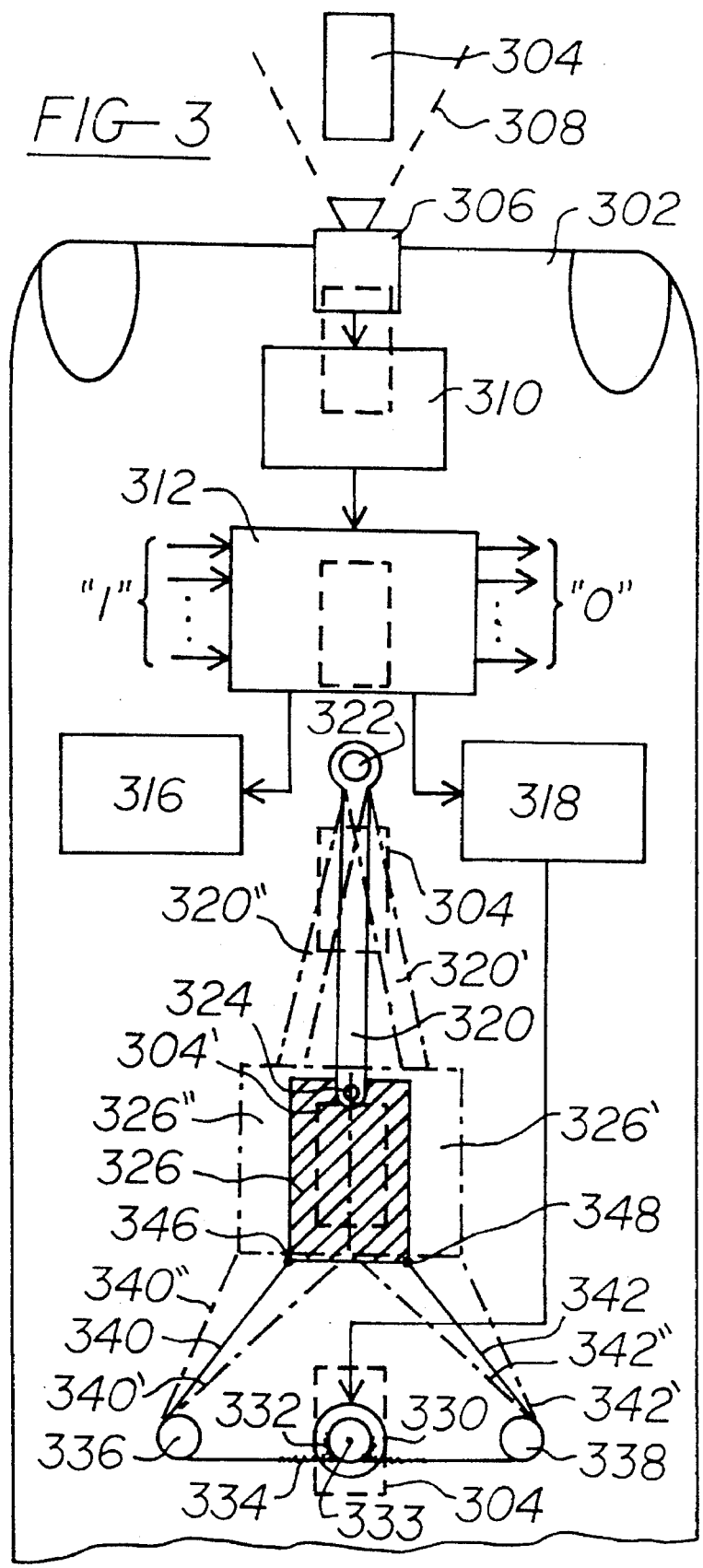

ELECTRIC VEHICLE PICK-UP POSITION CONTROL

FIELD OF THE INVENTION

The present invention relates generally to electrically powered vehicles and, in particular, to such vehicles adapted for use with roadways providing an inductive field to charge the vehicle's battery while moving and, more specifically, to the alignment of the inductive pick-up on the vehicle with respect to the electric field generators present ill the roadway, including bomb lateral positioning and control of the vehicle air gap.

BACKGROUND OF THE INVENTION

As a result of increased environmental consciousness, considerable attention is being directed toward electrically powered vehicles as an alternative to those designed to burn fossil fuels. Legislation is presently being considered in some jurisdictions which would require a percentage of all new vehicles to have no toxic emissions.

Most approaches to this goal involve electric propulsion. Given an electric vehicle, that is, one deriving its motive energy through an on-board electric motor, means must be provided for delivering electrical energy to that motor. If the vehicle is designed to move along a physically constrained track, which is often the case with trains, monorails and so-called "people movers," an electrical power source need not be carried by the vehicle bum, instead, may be entirely provided through inductive coupling between the track and some area of the bottom side of the vehicle. Many vehicles, including automobiles, are not designed to travel along physically exact pathways, but instead, lateral movement and speed are controlled entirely by the operator. Given the vast networks of highways throughout the world, forcing automobiles no travel in exacting tracks is an impractical goal for the foreseeable future.

Given the unpredictable movement of automobiles and other vehicles which use conventional roads and highways, electrically powered versions typically require a rechargeable battery pack to be carried on board. Given this requirement, various techniques have been proposed to recharge the batteries both between uses and during use. This requirement, various battery-powered recharging systems have been proposed, including direct connection and inductive systems operative while the vehicle is parked at a particular location, as well as systems wherein the recharging of the on-board cells is carried out while the vehicle travels along a roadway. My U.S. Pat. No. 5,311,973 "inductive Charging of a Moving Electric Vehicle's Battery" is related to such a system, as are certain of the patents issued to John G. Bolger, and others.

With the so-called "powered roadway" used in conjunction with the inductive charging of the battery in a moving electric vehicle, typically a series of primary coils are embedded on the top of the road surface, while secondary coils or some type of power pick-up device is mounted with respect to the vehicle's underbody. When the pick-up plate of the vehicle is substantially aligned with the field generator associated with the roadway, power is inductively coupled to the vehicle which is then used by the vehicle to charge its battery pack. Perhaps the most crucial problem associated with efficient coupling has to do with insuring the alignment between the roadway and vehicle counterparts or the inductive charge system, it should be obvious that the vehicle strays too far from a preferred path, power transfer will diminish. In the worst case, if the vehicle voids the powered track all together, no charging will take place and the vehicle may be stranded. It is quite important, then, to maintain consistent lateral positioning, that is, side-to-side positioning of the vehicle with respect to the preferred path along the roadway to maximize power transfer. But in addition, a valuable aspect that is typically overlooked in systems lacking a physically constrained track is the need to maintain a precise and controlled distance or "air gap" between the powered roadway and the vehicle pick-up, since, even if lateral positioning is perfect, maximum power coupling will still not occur unless the gap between the two inductive counterparts is substantially fixed as well.

SUMMARY OF THE INVENTION

In an electrically powered vehicle having an inductive pick-up configured to couple electrical power from a series of aligned and spaced-apart charging pads associated with a road surface, the present invention provides methods and apparatus for controlling the lateral positioning of the pick-up as well as the gap between the pick-up and the charging pads as the vehicle moves along a road surface. Control of the lateral positioning and gap may be provided either separately or in combination.

In the preferred embodiment, the pick-up is pivotally connected to the vehicle through an extension arm, She pivotal connection including a first position wherein vertical positioning of the pick-up is power controlled toward and away from the road surface, and a second position wherein airflow past the pick-up maintains the positioning of the pick-up relative to the road surface. The pick-up is also preferably airfoil-shaped, enabling air flow relative to the pick-up causes the pick-up to float above the road surface at a distance conducive to efficient coupling. The pick-up may further incorporate a hollow cavity enabling air to pass through so as to save weight and to further stabilize positioning. Passive or controllable wing-like features may optionally be added to assist in lowering the pick-up into a desired vertical position while travelling at high speed.

In terms of lateral positioning, the apparatus further includes a camera capable of sensing the charging pads as the vehicle moves, and means in operative communication with the camera for moving the pick-up side-to-side as the vehicle moves in response the position of the charging pads as sensed by the camera. Lateral positioning is controlled by imaging the charging pads with pattern-recognition module on-board the vehicle, the output of the pattern-recognition module interfacing to a device for actively controlling the side-to-side movement of the vehicle.

BRIEF DESCRIPTION OF THE DRAWINGS

FIG. 3 is a top-down schematic representation of a lateral positioning apparatus according to the invention.

DETAILED DESCRIPTION OF THE PREFERRED EMBODIMENTS

This invention concerns the inductive coupling of power to an electric vehicle wherein the vehicle is not physically constrained by a predetermined track. Accordingly, the invention is drawn toward apparatus and methods for maximizing inductive coupling despite the meandering path ordinarily taken by a vehicle over a highway. The invention therefore has great utility in conjunction with electric automobiles, trucks, busses and even two-wheeled electric vehicles which move under the will of their operator over a "powered" road surface. Although the invention is particularly suited to the charging of batteries carried on board such vehicles, the principles disclosed herein may be readily extended to such vehicles which derive all of their motive power through inductive coupling, that is, to such vehicles which do not transport their own rechargeable battery pack.

Figure 1:
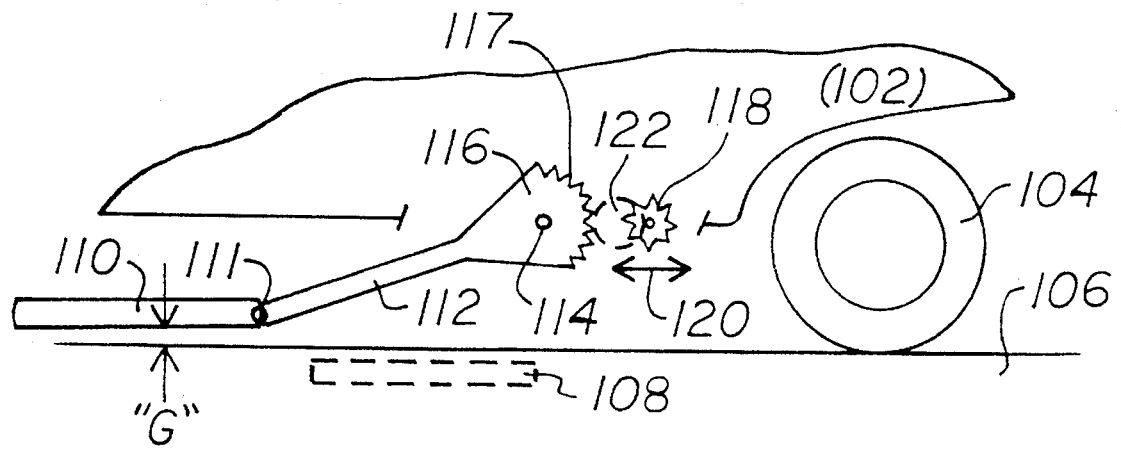
FIG. 1 is a side-view simplified drawing of an on-bard pick-up control system according to the invention.

In FIG. 1 there is shown a side view of a vehicle 102 in a skeletized form, having a front wheel 104 which makes contact with a road surface 106. This invention relates to the positioning of a pick-up 110 used to acquire electrical power from electromagnetic field generators 108 buried beneath the road surface 106 as the vehicle 102 travels rightwardly with respect to the figure. In particular, the invention discloses methods and means whereby the pick-up 110 is properly oriented with respect to the source 108, both in terms of lateral or side-to-side movement of the vehicle while traveling, and, in addition, independently and/or in combination with such lateral positioning, the air gap or distance "G" is also maintained at a distance conducive to efficient coupling. It is assumed that the vehicle 102 includes one or more rechargeable batteries or, in the alternative, incorporates an electric motive power system which may take advantage of any power available to the coupling of pick-up 110 through field generator 108. Broadly, then, the invention resides in techniques to keep the pick-up 110 properly aligned, both laterally and/or vertically with respect to the sources 108 as the vehicle travels along the road surface 106.

Continuing the reference to FIG. 1, the invention preferably pivotally attaches the pick-up 110 to a suspension arm 112 at a first joint 111, the arm 112 transitioning into a member 116 rotatable about an axis 114. The joint 111 is not actively controlled, but rather, permits pivotal rotation with respect to the pick-up 110 and arm 112 but only through a relatively narrow range of angles as seen in FIG. 1. Preferably, the joint 111 allows the plane of the pick-up 110 to be substantially parallel to most conventional road surfaces 106, without allowing the leftmost portion of the pick-up 110 to droop so far as to scrap against the road surface 106. Clockwise rotation of the pick-up 110 with respect to the pivot joint 111 is less critical, however, so long as the pick-up 110 may be retracted properly as described below. Although, in this position, the member 116 is more or less free to rotate about pivot point 114, means (not shown) are preferably further included to restrict such pivoting action within angles operative for the purpose intended, as with the restricted motion with respect to joint 111 as discussed earlier.

In FIG. 1, the pick-up 110 is shown in an operative position wherein a gear 118 movable laterally along axis 120 is pulled away from a position 122 where it is capable of meshing with the teeth 117 on the member 116. With the gear 118 retracted as shown, the am and member 116 are preferably free to move about the pivot point 114 with the gap "G" being determined by a combination of the restricted rotation possible through joint 111 and the flow of air past the pick-up 110 as the vehicle travels. When the vehicle slows down, stops or is otherwise no longer in need of power through conductive coupling, the gear 118 moves leftwardly with respect to FIG. 1, either in an automatic mode or in response to an operator control, enabling the teeth of gear 118 to mesh with those 117 of the member 116. Once meshed, the gear 118 moves counterclockwise with respect to the figure, causing the member 116 to generally move clockwise, thereby causing the arm 112 and pick-up 110 to vertically lift from the road surface 106. Depending upon the circumstances, the amount of lift may be temporary or minor, for example, in response to a stretch of rough or uneven terrain, or the pick-up 110 may be lifted vertically and against or into the underbody of the vehicle and stored during periods of non-use.

Figure 2:
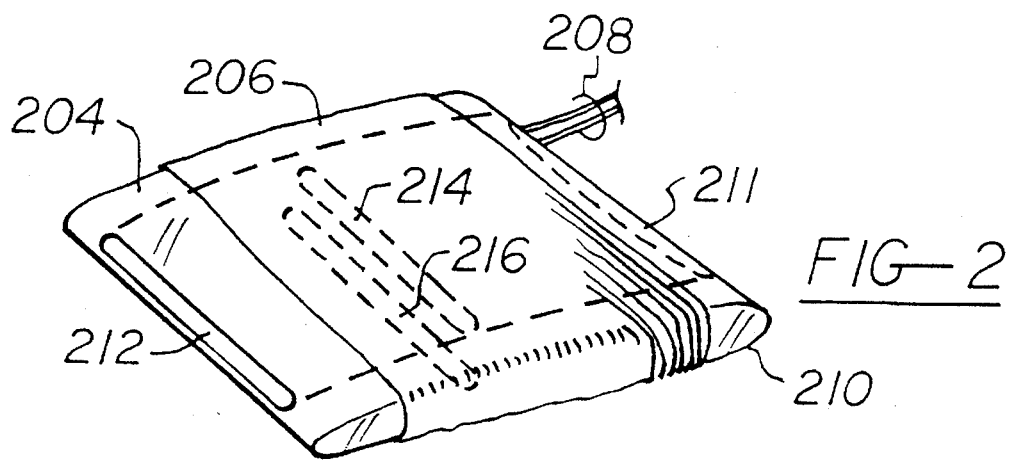
FIG. 2 is an oblique representation, partially in phantom form, illustrating a pick-up used in conjunction with the invention.

FIG. 2 illustrates one embodiment of the pick-up 110 which includes a form 204 upon which wires 206 are wound to form a winding assembly, with connection to the assembly being made possible through electrical conductors. In the preferred embodiment, this form 204 is shaped as an airfoil having a front portion with a curved undersurface 210 operative to assist in lifting the assembly as the vehicle travels along the roadway. Additionally, in the preferred embodiment the form 204 includes a hollow air passage having an inlet 211 and an outlet 212, to further assist and stabilizing the position of the pick-up during movement of the vehicle. It will be appreciated by those having skill in gas flow dynamics that other shapes may be used to provide lift in the presence of wind, and it will further be appreciated by those having skill in inductive charging that other coil-winding schemes may be used, including separate multiple windings, for example, symmetrical about an axis through the pick-up. Depending upon physical and/or mechanical constraints associated with the vehicle underbody, an additional vent 214 may be provided on the top of the form 210, or as an alternative, or in addition to a top vent 214, a bottom vent 216 may further be provided. All of these vents, including 212, may take on different shapes such as circular ports instead of the slotted shapes as shown, and may be sized or eliminated all together, depending upon the final physical realization of the invention, and including aspects of the vehicle such as the distance between the underbody to the road surface. More important than the number or shape of these vents is their ability to maintain the form 210 at a controlled an appropriate distance above the road surface during operation of the vehicle, this gap G typically being on the order of one or a few inches. Thus, the vented version of the form will act much like an air pump to keep the device at a controlled distance above the powered roadway. For example, assume that the air inlet 211 draws air at approximately $3\times$ ft$^3$/second, and that a smaller opening 216 at the bottom of the form is sized to output a portion of that air at $2\times^3$/second. As such, once the car is moving at a reasonably constant speed a lifting force will be created so as to raise the pick up and maintain it at a sufficiently constant vertical position. If too much lifting force is created, the bottom vents may be downsized or, alternatively, as mentioned previously, an upward vent 214 or set of vents may be provided which output air that pushes against the underside of the vehicle, thereby maintaining a balance position between the car body and the road surface.

Having described the apparatus and methods using air flow to realize correct vertical positioning, FIG. 3 shows a preferred technique according to the invention for ensuring lateral or side-to-side positioning of a pick-up 326 with respect to field-generation sources 304 placed along a roadway. Broadly, this aspect of the invention uses an image sensor and pattern-recognition techniques to determine misalignment with respect to the pick-up and field sources, and further to adjust the lateral positioning of the pick-up 326 from side-to-side in an effort to maximize coupling.

According to this aspect of the invention, a vehicle 302 is equipped with a video camera 306 having a field of view 308 operative to image roadway field generators 304 under normal operating conditions. The camera 306 associated with image capture is preferably mounted at the center position of the car, and may be integrated into or mounted upon the front bumper, beneath it or form some part of the underbody of the vehicle. Alternatively, the camera may be integrated into the retractable pick-up assembly though, the greater the distance between the camera 306 and the pick-up 326, the more likely a lateral adjustment will be possible, particularly at high speed.

Preferably, the shape of the sources 304 will have a predetermine and consistent rectangular shape, and will be buried beneath the road surface enabling the surface itself to be smooth and flat. To assist in identification of the power pad therebeneath, some type of visual indicator will preferably be used for identification purposes, such as a painted rectangle which may be easily picked up by the camera 306 during imaging. For night applications, a reflective paint may be used. In situations where painted indicia may be difficult to image, for example, if the paint has been worn out or the pads are covered by snow or dirt, or in the event of fog or conditions when the sun is low on the horizon, alternative embodiments of the invention with respect to the charging pads on the road surface may be used to enhance capturability by the camera. For example, the camera may be equipped to view in the infrared, and heating elements may be built into the charging pads, causing them to be brighter than the surrounding area due to the thermal emission. Since power is already being delivered to the charging pads for the surface of coupling energy to the vehicle, the use of a coil or resisted element to emit in the infrared may be conveniently implemented. As an alternative to active heating elements, the charging pads may be composed of a material or include a multi-layer structure which collects and stores solar energy, then slowly re-radiates this stored energy in the form of thermal radiation more visible to a camera which sees in the infrared. As one example of a structure which may be used, a relatively thick pad of dense black material may be used in alignment with the electrical shape of the charging pad, and this may be covered or laminated with a transparent panel, both to protect the underlying thermal mass and to create a greenhouse effect enabling the mass to store solar energy for subsequent release as thermal radiation.

Figure 4:
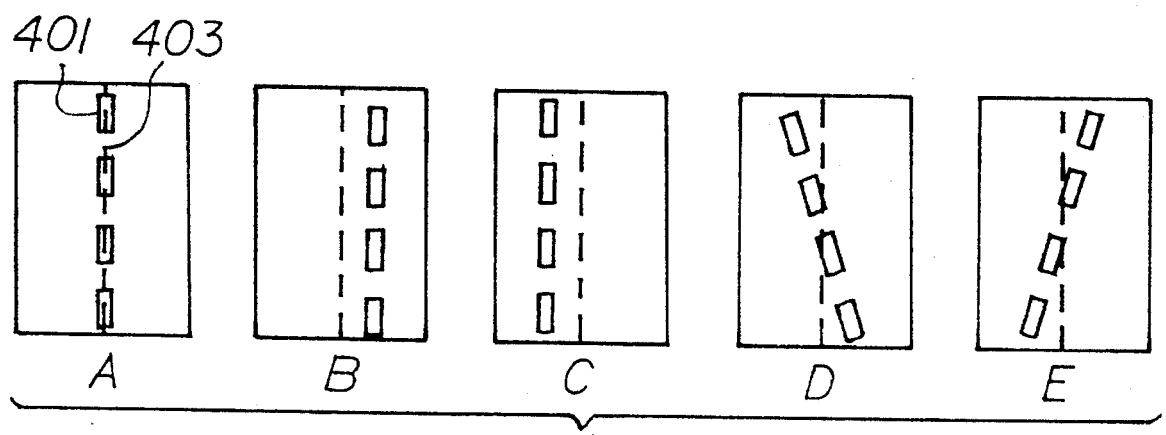
FIGS. 4A–E are representative image fields associated with the apparatus of FIG. 3 which may be used to correct the positioning of the vehicle's pick-up plate as a function of vehicle path.

The angle of view 308 of the camera 306 will be sufficiently large, such that in conjunction with its position on the vehicle, will provide for a reasonably great distance and viewing angle. In an alternative embodiment, as the pattern recognition electronics described in greater detail below are able to determine in advance aspects of the path taken by the vehicle, the camera may be secured to the vehicle using a pan/tilt mount, with the on-board processing electronics being used not only to adjust the positioning of the pickup, but also to adjust the side-to-side and up-and-down movements of the camera so as to more accurately train the camera's field of view onto the sequence of charging pads. As a further alternative, adjustment of angle of view may also be controlled, either independently or in conjunction with pan or tilt, for example, in conjunction with the speed of the vehicle, the visibility of the road surface, or other conditions. That is, if the vehicle is moving at a high rate of speed, the camera will preferably "look" further out ahead of the vehicle to ensure that the on-board pattern recognition processing unit will have sufficient time to respond and adjust the positioning of the pick-up coil accordingly. The image captured by the camera 306 will be delivered to an on-board image processing unit 310 and, due to the unique pattern for the "guide marks" associated with the charging pads 304, it should be easy for those skilled in image processing to filter out sources of noise and concentrate on the shape of the charging pads 304. Broadly, the function of the image processing unit 310 is to compare the alignment between the pads 304 and that of the longitudinal axis of the vehicle. FIG. 4A shows an ideal alignment between the longitudinal axis 403 and the pads 401 associated with a road surface. In FIGS. 4B and 4C, the vehicle is traveling in a straight line but too far to the left and right, respectively. In such cases, the charging pad may be moved to the right or left, respectively, beneath and preferably in parallel alignment with the vehicle, thus enabling the vehicle to maintain its present heading while improving inductive coupling. In FIGS. 4D and 4E, the car is performing a right-hand and left-hand turn, respectively, in which cases the pick-up may be pivoted clockwise and counterclockwise respectively, with respect to the undercarriage of the vehicle. Preferably, in this case a pendulum-like motion of the pick-up is used to keep the axis of the pick-up parallel to the line of the charging pads, and not the axis of the vehicle, as in the case of FIGS. 4B and 4C.

The output of the image processing unit 310 is fed to an on-board pilot control module or OPCM 312. Within the OPCM, the attributes of the image difference between the axis of the vehicle might include left/right misalignment, angles between the direction of travel versus the position of the charging pads, and so forth. The purpose of the OPCM is to calculate lateral positioning of the charging pad 326 so as to match the center line of the power pads to maximize coupling therebetween. In addition, the OPCM may accept inputs "I" from other types of auto-pilot sensor mechanisms, including infrared, radar or ultrasonic transducers, and provide other types of motion control output "O" including brake controls, acceleration, steering, and so forth. Thus, the OPCM will become an integral part of the intelligent vehicle highway system or IVHS forming part of the entire vehicle control system.

The OPCM 312 interfaces bidirectionally with a central control unit 316 associated with operator inputs, and so forth, and additionally controls a motor drive module 318 which, in turn, controls a motor 330 operative to provide lateral positioning of the pick-up 326, as will now be described. The pick up 326 is preferably connected to a pivoting joint 322 through arm 320, which is designated with numerical reference 112 in FIG. 1. Although the following lateral positioning mechanisms now being described are not evident from FIG. 1, it should be understood to those having mechanical skill that in addition to the rotation possible about pivot point 114 in FIG. 1, a more sophisticated joint offering multiple degrees of freedom may be used at both the forward point where the support arm connects to the underbody car and the rearward point where it connects to the pick up to facilitate both up.-and-down and lateral or side-to-side positioning simultaneously. It is assumed in the present discussion that one or more joints providing the requisite degrees of freedom are used in the embodiment of the invention wherein both the air gap and lateral positioning of the pick up are controlled.

FIG. 3 show one position of the pick up at 326 (with diagonal hash marks) aligned more or less directly above one of the inductive field generators 304'. In addition, as a result of the control provided by the invention, a second position rightward to center is shown at 326', with the arm having rotated counterclockwise in a pendulous manner to position 320', and a third position leftward of center at 326", the arm 320 having pivoted to position 320". It should be understood that a greater side-to-side range may also be possible, and that lateral positioning of the pick up at any point between the two available left and right extremes may also be assumed with the mechanism.

In this particular embodiment, motor drive 318 is used to control a motor 330 having a shaft 333 which faces out of the drawing, onto which a gear 332 is mounted. A movement control line connects to the pick up at a first point 348, is wound around a first rotatable wheel 338, past the motor assembly, around a second wheel 336, and finally reconnects to the other side of the pick up 326 at point 346. In the lower part of the drawing, this control line preferably includes at least a partial chain portion 334 which interacts operatively with the teeth 332 of the motor 330, such that with rotation of the motor, preferably a stepper motor, lateral positioning of the pick up 326 occurs, enabling a multitude of increments between the extremes of 326' and 326" in accordance with the orientation of the vehicle with respect to the roadway field generators 304 while the vehicle moves, as sensed by the camera 306 and electronically interpreted through the on-board pilot control module 312. It should be pointed out with respect to FIG. 3 that as an alternative to the vertical positioning mechanism described with reference to FIG. 1, or as an alternative for use in combination therewith, the motor 330 of FIG. 3 may be placed on a mechanical stage which moves up and down with respect to the vehicle (into and out of the plane of the drawing), such that, with or without movement of the gear 332, motor 330 may be moved up and down with respect to the vehicle along with wheels 336 and 338, thereby moving the pick-up 326 as well.

It should be appreciated by those having mechanical skill that other mechanisms may alternatively be utilized to provide such lateral positioning, for example, the support arm connecting the vehicle to the pick up at the vehicle end may be linked directly or indirectly to the motor provided, thereby providing a simpler pendulum-type movement and response to the rotation thereof. To ensure that the pick up as it moves from side to side is not skewed with respect to the roadway generators during movement, a pair of support arms may be used in place of a single arm to maintain proper orientation.

What is claimed is:

1. An inductive pick-up apparatus for an electrically powered vehicle comprising:

an inductive pick-up configured for use with a series of aligned and spaced-apart charging pads associated with a road surface; and a device for automatically controlling a relative position between the pick-up and the charging pads while the vehicle moves along the road surface, the device including an extension arm connected to the vehicle, the pick-up being pivotally attached to the extension arm, and wherein the shape of the pick-up enables the pick-up to maintain a consistent air gap between the pick-up and the charging pads solely due to the airflow acting on the pick-up, while said device is in a first mode of operation.

2. The apparatus of claim 1, wherein the pivotal facilitates a second mode of operation of the device wherein the vertical positioning of the pick-up is power controlled.

3. The apparatus of claim 1, wherein the pick-up is airfoil-shaped.

4. The apparatus of claim 3, wherein the airfoil-shaped pick-up includes a hollow cavity with one or more air intakes and with one or more air output ports, the output ports expelling air so as to create a pressure operative to help maintain the air gap.

5. The apparatus of claim 1, further including means for controlling the lateral positioning of the pick-up relative to the vehicle as the vehicle moves along the road surface.

6. The apparatus of claim 5, wherein the means for controlling the lateral positioning of the pick-up relative to the vehicle as the vehicle moves along the road surface further includes:

a camera mounted at a forward end of the vehicle, the camera being capable of sensing the charging pads as the vehicle moves; and means in operative communication with the camera for moving the pick-up from side-to-side, relative to the vehicle, in response to the position of the charging pads as sensed by the camera.

7. The apparatus of claim 6, wherein the pick-up and vehicle both having a longitudinal axis, and the means for moving the pick-up from side-to-side includes means for maintaining a parallel relationship between the two axes as the pick-up is moved side-to-side.

8. In an electrically powered vehicle having an inductive pick-up configured for use with a series of aligned and spaced-apart charging pads associated with a road surface, the improvement comprising:

an apparatus for controlling the lateral positioning of the pick-up relative to the vehicle as the vehicle moves along the road surface, the apparatus including:

a camera mounted at a forward end of the vehicle, the camera being capable of sensing the charging pads as the vehicle moves; and means in operative communication with the camera for moving the pick-up side-to-side, relative to the vehicle, in response to the position of the charging pads as sensed by the camera.

9. The improvement of claim 8, wherein the pick-up and vehicle both have a longitudinal axis, and wherein the means for moving the pick-up from side-to-side includes means for maintaining a parallel relationship between the two axes as the pick-up is moved side-to-side.

10. In an electrically powered vehicle having an inductive pick-up configured to couple electrical power from a series of aligned and spaced-apart charging pads associated with a road surface, the improvement comprising:

lateral positioning means for automatically controlling the lateral positioning of the pick-up relative to the vehicle as the vehicle moves along the road surface; and vertical positioning means for automatically controlling a gap between the pick-up and the charging pads as the vehicle moves along the road surface.

11. The improvement of claim 10, further including pattern-recognition electronics on-board the vehicle which sense images of the charging pads as the vehicle moves along the road surface and which generate signals in response to a position of the images sensed, and wherein the lateral positioning means is controlled by the signals and moves the pick-up from side to side with respect to the vehicle in accordance with the signals.

12. The improvement of claim 10, wherein the vertical positioning means uses air flow, which contacts the pick-up as the vehicle moves along the road surface, to automatically control the gap between the pick-up and the charging pads.

13. A system for charging a battery on-board a vehicle as it travels along a road surface, comprising:

a series of aligned and spaced-apart charging pads associated with the road surface;

an inductive pick-up associated with the vehicle to couple electrical power from the pads to the battery; and apparatus on-board the vehicle for controlling the physical relationship between the pick-up and the charging pads as the vehicle moves to increase coupling efficiency therebetween, including means for sensing the position of the charging pads and outputting a signal representative of the relative alignment between the charging pads and the inductive pick-up; and means for orienting the inductive pick-up with respect to the charging pads in response to the signal.

14. The system of claim 13, wherein the means for sensing the position of the charging pads includes a camera mounted at a forward end of the vehicle having a field of view with which to visually perceive one or more oncoming charging pads.

15. The system of claim 14, further including a power-adjustable mount for the camera operative to modify the field of view as a function of the relative alignment between the charging pads and the inductive pick-up.

16. The system of claim 14, further including means for improving the ability of the camera to visually perceive one or more oncoming charging pads.

17. The system of claim 16, wherein the means for improving the ability of the camera to visually perceive one or more oncoming charging pads includes the addition of visual indicia to enhance the visibility of the pads relative to the surrounding road surface.

18. The system of claim 17, wherein the visual indicia includes reflective paint.

19. The system of claim 16, wherein the means for improving the ability of the camera to visually perceive one or more oncoming charging pads includes means for heating the charging pads and a camera which senses in the infrared region of the spectrum.

20. The system of claim 19, wherein the means for heating the charging pads are electrically powered.

21. The system of claim 19, wherein the means for heating the charging pads are solar powered.

* * * * *

UNITED STATES PATENT AND TRADEMARK OFFICE
CERTIFICATE OF CORRECTION

PATENT NO. : 5,595,271
DATED : January 21, 1997
INVENTOR(S) : Tseng

It is certified that error appears in the above-indentified patent and that said Letters Patent is hereby corrected as shown below:

Column 1, line 11: Replace "ill" with --in--.

Column 1, line 12: Replace "bomb" with --both--.

Column 1, line 30: Replace "bum" with --but--.

Column 1, line 37: Replace "no" with --to--.

Column 1, line 44: Replace "This" with --Given this--.

Column 1, line 50: Replace "inductive" with --Inductive--.

Column 1, line 65: Replace "or" with --of--.

Column 1, line 66: Replace "that the" with --that if the--.

Column 2, line 1: Replace "voids" with --avoids--.

Column 2, line 25: Replace "She" with --the--.

UNITED STATES PATENT AND TRADEMARK OFFICE
CERTIFICATE OF CORRECTION

PATENT NO. : 5,595,271
DATED : January 21, 1997
INVENTOR(S) : Tseng

It is certified that error appears in the above-indentified patent and that said Letters Patent is hereby corrected as shown below:

Column 3, line 60: Replace "am" with --arm--.

Column 4, line 49: Replace "$2x^3$" with --$2xft^3$--.

Column 6, line 54: Replace "am" with --arm--.

Column 7, line 61: After "pivotal" insert --connection--.

Signed and Sealed this

Twenty-ninth Day of April, 1997

Attest:

BRUCE LEHMAN

Attesting Officer

Commissioner of Patents and Trademarks